(12) United States Patent
Chuman

(10) Patent No.: US 7,072,125 B2
(45) Date of Patent: Jul. 4, 2006

(54) LENS HOLDER AND LENS-FITTED PHOTOGRAPHIC FILM UNIT

(75) Inventor: Hirokatsu Chuman, Minami-Ashigara (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 11/228,261

(22) Filed: Sep. 19, 2005

(65) Prior Publication Data

US 2006/0061884 A1 Mar. 23, 2006

(30) Foreign Application Priority Data

Sep. 17, 2004 (JP) .............................. 2004-271897

(51) Int. Cl.
*G02B 7/02* (2006.01)

(52) U.S. Cl. ...................... 359/811; 359/813; 359/819; 359/821

(58) Field of Classification Search ................ 359/811, 359/813, 819, 821, 822, 823, 824, 825, 826, 359/827

See application file for complete search history.

(56) References Cited

U.S. PATENT DOCUMENTS 6,341,901 B1 * 1/2002 Iwasa et al. ................ 396/355

FOREIGN PATENT DOCUMENTS

| JP | 06-300950 | 10/1994 |
| JP | 2002-250956 | 9/2002 |

* cited by examiner

*Primary Examiner*—Timothy Thompson
(74) *Attorney, Agent, or Firm*—Young & Thompson

(57) ABSTRACT

A first lens, a first spacer ring, a second lens, a second spacer ring, and a third lens are disposed along an optical axis and from the subject side in the stated order within a holder main body. A flare stopper in the shape of a ring (a washer) is integrally formed with an inner periphery of the second spacer ring. The flare stopper is formed to protrude toward the third lens and positions a circular opening thereof close to a concave surface of the third lens, so as to cover a peripheral area of the concave surface. Accordingly, both the light toward a peripheral surface of the third lens and toward a peripheral surface of an exposure opening are blocked by the flare stopper.

15 Claims, 4 Drawing Sheets

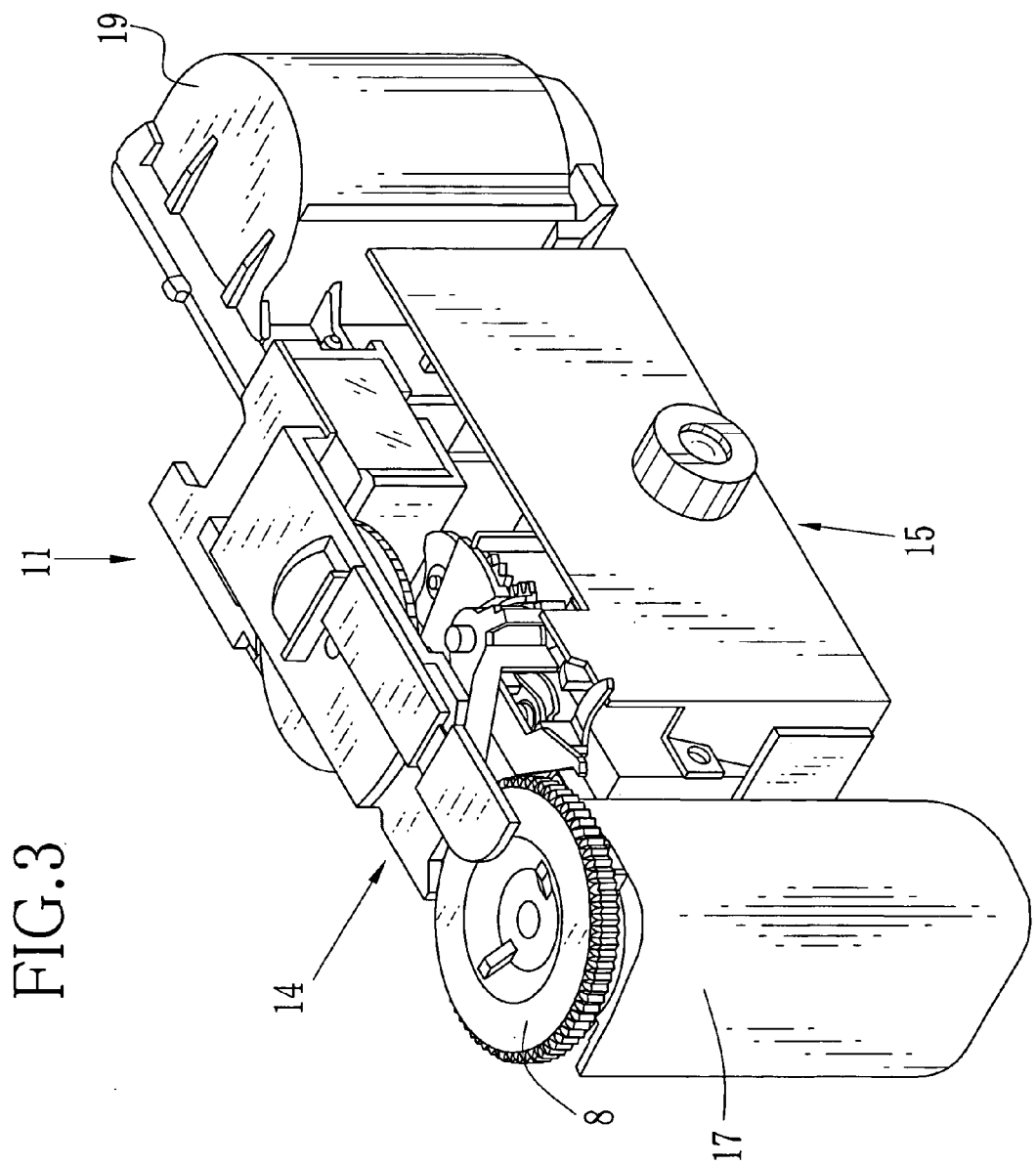

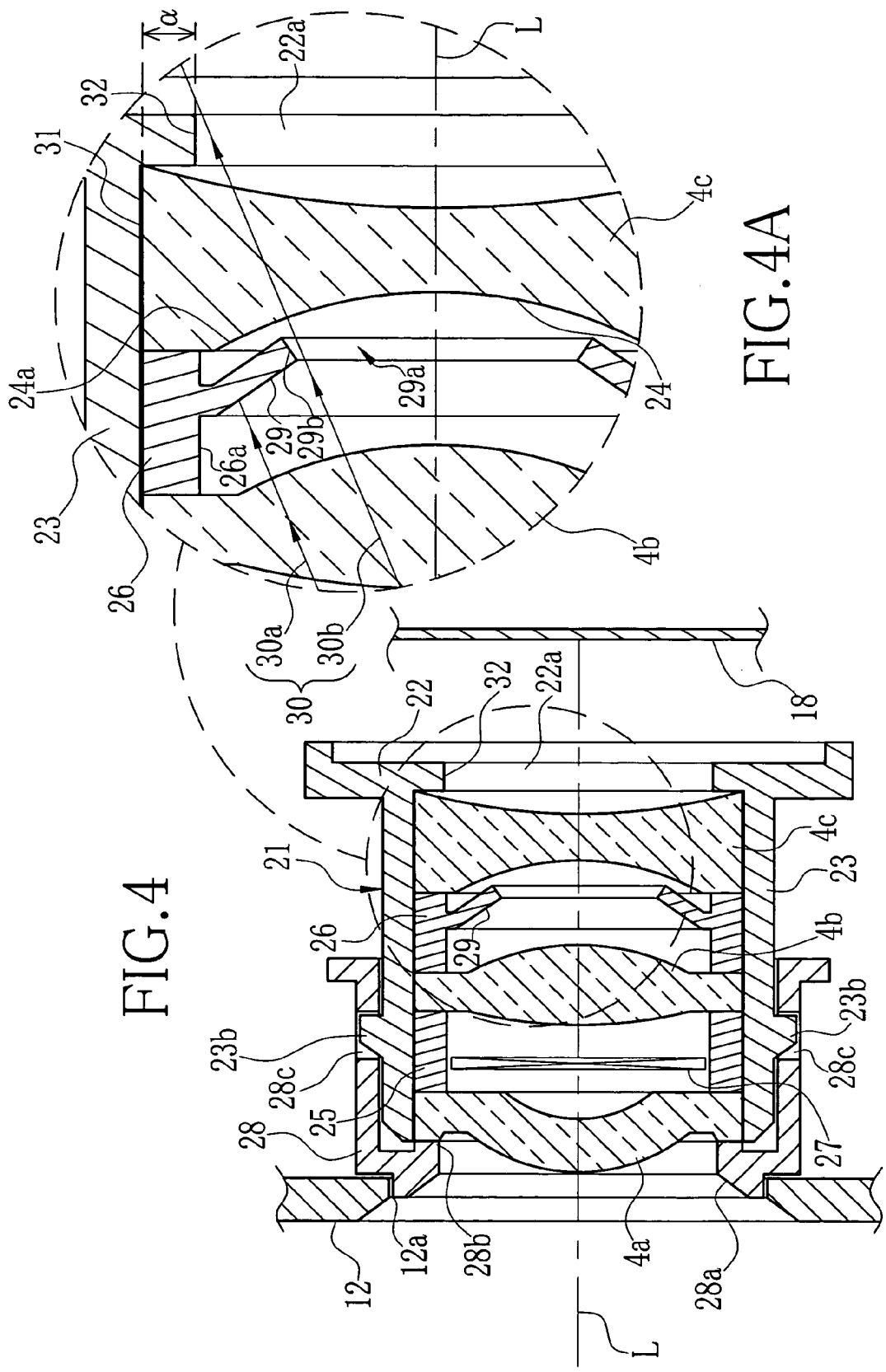

LENS HOLDER AND LENS-FITTED PHOTOGRAPHIC FILM UNIT

BACKGROUND OF THE INVENTION

1. Field of the Invention

The present invention relates to a lens holder to be incorporated in an optical device, and a lens-fitted photographic film unit having the lens holder incorporated therein.

2. Background Arts

A lens-fitted photographic film unit with a preloaded photographic film is well known to be a simple camera for single-use. The lens-fitted photographic film unit has a lens holder incorporated therein, for holding a taking lens. In the lens holder, a flare stopper is provided to prevent the flare caused by the unnecessary light reflected on a peripheral surface of the taking lens or an inner surface of the lens holder.

Such a flare stopper is disclosed in, for example, Japanese Patent Laid-Open Publication Number 2002-250956 and Japanese Patent Laid-Open Publication Number 06-300950. The flare stopper is in the shape of a ring like a washer and made of Mylar®, which is a polyester film of, for example, 0.03 mm in thickness. The flare stopper prevents the flare by allowing the photography light to pass through an opening formed at the center thereof.

However, if the taking lens comprises a plurality of lenses including a concave lens and, at the same time, the washer-shaped flare stopper as stated above is disposed on the subject side of the concave lens to face a concave surface of the concave lens, the space between the flare stopper and the concave surface is so large that the flare stopper cannot shield the photography light toward the peripheral surface of the concave lens, which result in causing the ghost and the flare with the reflected photography light.

In order to prevent the photography light from reaching the peripheral surface of the concave lens, it is necessary to elongate the distance from an effective photographing range to the peripheral surface of the concave lens. This requires enlarging the taking lens and the lens holder.

SUMMARY OF THE INVENTION

A main object of the present invention is to provide a lens holder and a lens-fitted photographic film unit that are capable of preventing occurrence of ghost and flare when a concave lens is employed as a taking lens.

In order to achieve the above object and other objects, the lens holder of the present invention is provided with a holder main body for holding the concave lens with its concave surface in the subject side, and a flare stopper having at least a portion protruding toward the concave surface of the concave lens for limiting the light to enter the concave lens by covering a peripheral portion of the concave surface, and the flare stopper is supported on the subject side of the concave lens in the holder main body.

Preferably the flare stopper is integrally formed with the holder main body. When the taking lens comprises a plurality of lenses including the concave lens, it is preferred that a spacer is provided between the lenses for keeping the space between the lenses and that the flare stopper is integrally formed with the spacer.

The lens-fitted photographic film unit of the present invention is characterized in having the lens holder of the present invention.

With the flare stopper having a portion protruding toward the concave surface of the concave lens, the lens holder of the present invention is capable of allowing only the necessary photography light into the concave lens by shielding the unnecessary photography light, which may cause the ghost and the flare. That is, the flare stopper shields the photography light toward the peripheral surface of the concave lens. In addition, the present invention enables to downsize the lens and the lens holder, as it is possible to reduce the distance in the direction of the lens diameter from the periphery of the circular opening of the flare stopper to the peripheral surface of the concave lens, so long as the flare stopper shields the photography light toward the peripheral surface of the concave lens.

Since the flare stopper of the present invention is integrally formed with the holder main body or the spacer, the flare stopper can be easily disposed in an accurate position when the concave lens is set in the holder main body or the spacer. Such integral construction of the flame stopper reduces the number of components, and the assembling steps as a result.

Furthermore, since the lens-fitted photographic film unit of the present invention is provided with the lens holder of the present invention, it is capable of improving the quality of photograph by preventing the ghost and the flare.

BRIEF DESCRIPTION OF THE DRAWINGS

One with ordinary skill in the art would easily understand the above-described objects and advantages of the present invention when the following detailed description is read with reference to the drawings attached hereto.

FIG. 3 is perspective view illustrating a unit body; and

FIG. 4 is a cross-sectional view illustrating a constitution in a lens holder supporting lenses and spacers, and FIG. 4A is a magnified view of a main portion of FIG. 4.

PREFERRED EMBODIMENTS OF THE INVENTION

Figure 1:
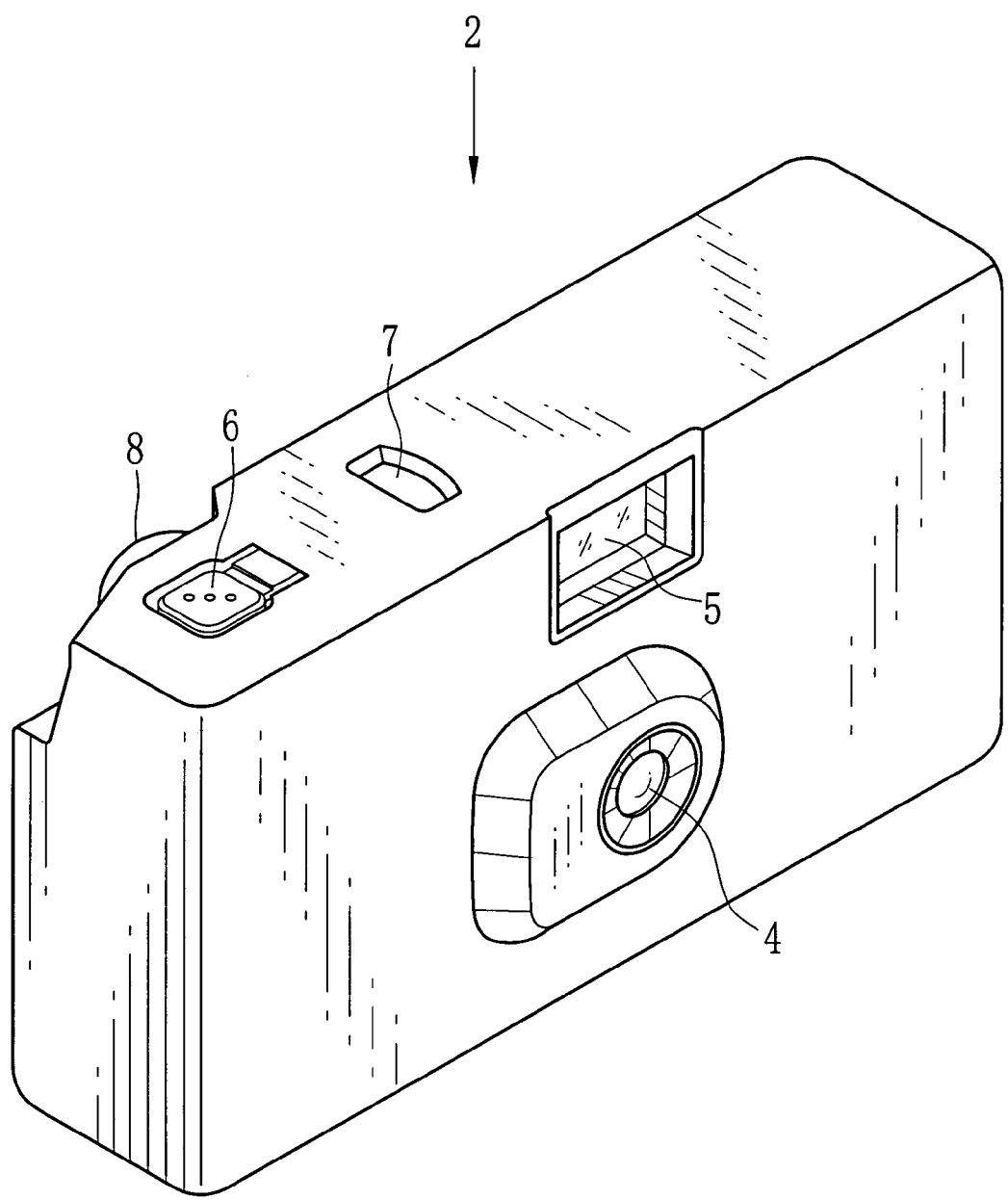
FIG. 1 is a perspective view illustrating an exterior of a lens-fitted photographic film unit of the present invention.

As shown in FIG. 1, a lens-fitted photographic film unit 2 is provided with a taking lens 4 and an object-side viewfinder window 5 on the front face, a shutter release button 6 and a frame counter window 7 on the top face, and a film winder wheel 8 on the rear face.

Figure 2:
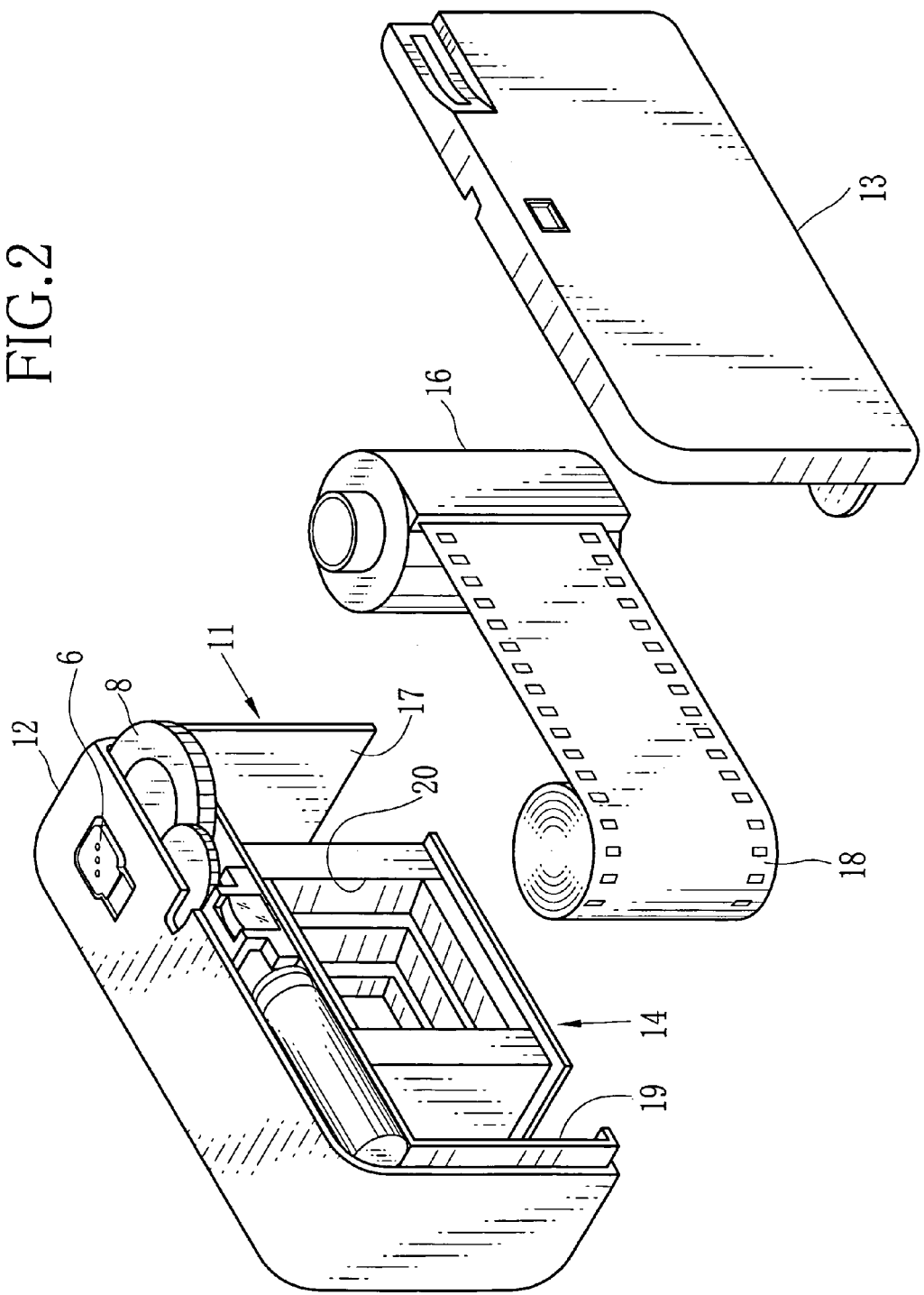
FIG. 2 is an exploded perspective view illustrating the rear side of the lens-fitted photographic film unit of the present invention.

As shown in FIG. 2 and FIG. 3, the lens-fitted photographic film unit 2 comprises a unit body 11, a front cover 12, and a rear cover 13. The unit body 11 comprises a body base 14 and an exposure unit 15, and the body base 14 includes a cartridge chamber 17 for containing a cartridge 16, a film roll chamber 19 for containing a roll of a photographic film 18 drawn from the cartridge 16, and an aperture 20 for determining the exposure area of the photographic film 18. The exposure unit 15 is located approximately at the center of the unit body 11, and provided with a shutter mechanism, a film winding stop mechanism, and a frame counter mechanism for displaying an available frame number, that are incorporated therein.

The front side of the unit body 11 is covered with the front cover 12, while the rear cover 13 covers the rear side of the unit body 11. The covers 12 and 13 together shield the unit body 11 in a light-tight manner. The rear cover 13 is provided with two bottom lids for covering the respective bottom of the cartridge chamber 17 and for the film roll chamber 19 in a light-tight manner.

The film winder wheel 8 is provided on top of the cartridge chamber 17 for feeding the photographic film 18 when rotated. The photographic film 18 is drawn from the film roll chamber 19 to the cartridge chamber 17 via a film path between the rear surface of the unit body 11 and the rear cover 13. Engaging with an elastic pawl, the film winder wheel 8 is prevented from rotated in the opposite direction to the film winding direction.

As shown in FIG. 4, the taking lens 4 comprises three lenses of a first lens 4a, a second lens 4b, and a third lens 4c. The first, the second and the third lenses 4a–4c are made of plastic and supported within a lens holder 21 disposed in front of the exposure unit 15. The lens holder 21 comprises an approximately plate-shaped holder plate portion 22 to be set at the aperture 20, a maximum open aperture 22a formed at the center of the holder plate portion 22, and a holder main body 23 of a cylindrical shape integrally formed with the holder plate portion 22 on the object side thereof.

The first lens 4a is disposed with its convex surface in the object side and its concave surface in a focal-plane side. The second lens 4b is a biconvex lens, and the third lens 4c has a concave surface 24 in the object side. The taking lens 4 comprising different types of lenses has the advantage of reducing aberration than that of the taking lens having a single lens.

The lens holder 21 is provided with a first spacer ring 25 and a second spacer ring 26. Both of the spacer rings 25 and 26 are employed for keeping the lenses at intervals: the first spacer ring 25 is disposed between the first lens 4a and the second lens 4b to keep the space therebetween, and the second spacer ring 26 is disposed between the second lens 4b and the third lens 4c to keep the space therebetween. The holder main body 23 supports the first lens 4a, the first spacer ring 25, the second lens 4b, the second spacer ring 26, and the third lens 4c within thereof in the stated order from the object side. A shutter blade 27 for opening/closing in response to the operation of the shutter button 6 is disposed between the first lens 4a and the second lens 4b.

A lens retention plate 28 is attached to the holder main body 23 on the object side thereof. An opening 28a is formed on the lens retention plate 28 to expose the taking lens 4, and the lens retention plate 28 is fitted in a lens opening 12a formed on the front cover 12. A ridge 28b in the shape of a ring is formed on the lens retention plate 28. The ridge 28b protrudes from the edge of the opening 28a toward the focal-plane side and holds the periphery of the first lens 4a.

The lens retention plate 28 is provided with a hole 28c for engaging with a claw 23b of the holder main body 23 so as to fix on the holder main body 23. Accordingly, the taking lens 4 together with the first and the second spacer rings 25 and 26 is supported by the holder main body 23 between the lens retention plate 28 and the holder plate portion 22. That is, the first lens 4a is nipped by the ridge 28b of the lens retention plate 28 and the first spacer ring 25, the second lens 4b is nipped by the first spacer ring 25 and the second spacer ring 26, and the third lens 4c is nipped by the second spacer ring 26 and the holder plate portion 22. Note that the lens holder 21, the first and the second spacer rings 25 and 26, and the lens retention plate 28 is formed of resin with light-shielding property.

A flare stopper 29 in the shape of a ring (a washer) is integrally formed with an inner surface 26a of the second spacer ring 26. The flare stopper 29 functions as a light-shielding wall for preventing the flare by limiting a photography light 30 to enter third lens 4c. The flare stopper 29 is provided with a circular opening 29a formed at the center thereof. The flare stopper 29 protrudes toward the concave surface 24 of the third lens 4c such that an edge 29b is close to the concave surface 24, in order to cover a peripheral area 24a of the concave surface 24. Accordingly, the photography light 30 having passed through the second lens 4b is prevented from reaching the peripheral area 24an and, as a result, the peripheral surface 31 of the third lens 4c and a peripheral surface 32 of the opening 22a.

The flare stopper 29 is formed of resin of 0.03 mm to 0.05 mm in thickness with light-shielding property. As integrally formed with the second spacer ring 26 and mounted in the lens holder 21, the flare stopper 29 can be accurately positioned in the lens holder 21 with regard to an optical axis of the taking lens 4.

The following description explains the operation of the lens-fitted photographic film unit with the above constitution. When the shutter button 6 is pressed down, the shutter blade 27 opens to allow the photography light 30 into the taking lens 4. The photography light 30 comprises a light 30a passes the first and the second lenses 4a and 4b and directs to the peripheral surface 31 of the third lens 4c or the peripheral surface 32 of the opening 22a, and a light 30b passes the first and the second lenses 4a and 4b and enters the circular opening 29a and the opening 22a without reflecting on either the peripheral surface 31 of the third lens 4c or the peripheral surface 32 of the opening 22a. Only the light 30b is allowed into the third lens 4c, because the flare stopper 29 protrudes toward the concave surface 24 of the third lens 4c overhanging the peripheral area 24a of the concave surface 24 and blocks the light 30a.

It is thus possible to prevent the flare and the ghost caused by the light 30a reflected on the peripheral surface 31 of the third lens 4c or the peripheral surface 32 of the opening 22a. The light 30b passing through the circular opening 29a transmits the third lens 4c and exposes the photographic film 18. Since the flare stopper 29 is protruding toward the concave lens 24, the third lens 4c can be reduced in size within a range of that the light 30b having passed through the circular opening 29a will not reach either the peripheral surface 31 of the third lens 4c or the peripheral surface 32 of the opening 22a; that is, the range is a distance a between the peripheral surface 31 of the third lens 4c and the peripheral surface 32 of the opening 22a in the direction of the lens diameter. With downsizing of the third lens 4c, the lens holder 21 can be reduced in size as well.

Although the flare stopper 29 is integrally formed with the second spacer ring 26 in the above embodiment, it is also possible to integrally form the flare stopper 29 with the holder main body 23. In such a case, it is preferred to integrally form the second spacer ring 26 or a similar type spacer with the holder main body 23 and then integrally form the flare stopper 29 with the second spacer ring 26 or the similar type spacer.

Note that it is also possible to separately mold the second spacer ring 26 and the flare stopper 29 and then combine them. In this case, the flare stopper 29 is produced by punching out a black polyester film of 0.03 to 0.05 mm in thickness into a ring shape, and then the flare stopper 29 is fitted in a groove formed on the second spacer ring 26.

Note that the thickness of the flare stopper 29 is not limited in the range from the 0.03 to 0.05 mm, and that the constitution of the taking lens 4 is not limited in the above embodiment.

The lens holder of the present invention is not limited to be employed in the lens-fitted photographic film unit 2 as stated in the above embodiment, but is applicable to other various optical devices such as, for example, a digital camera or a cell-phone with a camera and effective especially for the optical device using a small lens.

Although the present invention has been described with respect to the preferred embodiments, the present invention is not to be limited to the above embodiments but, on the contrary, various modifications will be possible to those skilled in the art without departing from the scope of claims appended hereto.

What is claimed is:

1. A lens holder comprising:
   a holder main body having:
      a concave-convex lens disposed with its convex surface facing a object side,
      a biconvex lens, and
      a concave lens with a concave surface facing the object side, the lenses being disposed from the subject side in the stated order;
   a flare stopper having at least a portion protruding toward said concave surface, said flare stopper limiting the light toward said concave lens by covering a peripheral portion of said concave surface, and being supported on the object side of said concave lens in said holder main body.

2. A lens holder defined in claim 1, wherein said flare stopper is integrally formed with said holder main body.

3. A lens holder defined in claim 1, wherein said holder main body supports spacers provided between each of said lenses.

4. A lens holder defined in claim 3, wherein said flare stopper is integrally formed with said spacer.

5. A lens holder defined in claim 4, wherein said spacer is integrally formed with said holder main body.

6. A lens holder comprising:
   a holder main body having a concave lens with a concave surface in the object side;
   a flare stopper having at least a portion protruding toward said concave surface, said flare stopper limiting the light toward said concave lens by covering a peripheral portion of said concave surface, and being supported on the object side of said concave lens in said holder main body;
   wherein said holder main body supports spacers provided between each of said lenses; and
   wherein said flare stopper is a ring made of black polyester film, and said spacer has a groove to fit said flare stopper therein.

7. A lens-fitted photographic film unit having a lens holder incorporated therein, said lens holder comprising:
   a holder main body having a concave lens with a concave surface in the object side;
   a flare stopper having at least a portion protruding toward said concave surface, said flare stopper limiting the light toward said concave lens by covering a peripheral portion of said concave surface, and being supported on the object side of said concave lens in said holder main body;
   wherein said holder main body supports spacers provided between each of said lenses; and
   wherein said flare stopper is a ring made of black polyester film, and said spacer has a groove to fit said flare stopper therein.

8. A lens holder comprising:
   a holder plate defining an aperture;
   a holder main body arranged on a object side of the holder plate, the holder main body having a concave lens with a concave surface facing the object side; and
   a flare stopper having at least a portion protruding toward said concave surface, said flare stopper limiting the light toward said concave lens by covering a peripheral portion of said concave surface, and being supported on the object side of said concave lens in said holder main body;
   wherein the flare stopper, the concave lens, and the holder plate are structured and arranged so that the flare stopper prevents any light from entering the object side of the concave lens and falling upon an edge of the aperture defined by the holder plate.

9. The lens holder of claim 8, wherein the edge of the aperture defined by the holder plate lies closer to an optical axis of the concave lens than does a perimeter of the concave lens.

10. The lens holder of claim 8, wherein an image side of the concave lens abuts the holder plate.

11. The lens holder of claim 9, wherein an image side of the concave lens abuts the holder plate.

12. A lens holder defined in claim 8, wherein said holder main body supports a plurality of lenses including said concave lens and spacers provided between each of said plurality of lenses.

13. A lens holder defined in claim 12, wherein the plurality of lenses comprises a concave-convex lens, a biconvex lens, and said concave lens disposed from the object side in the stated order, and said concave-convex lens is disposed with its convex surface facing the object side.

14. A lens holder defined in claim 8, wherein said flare stopper is a ring made of black polyester film, and said spacer has a groove to fit said flare stopper therein.

15. A lens holder defined in claim 12, wherein said flare stopper is a ring made of black polyester film, and said spacer has a groove to fit said flare stopper therein.

* * * * *